(No Model.)

S. DAVIS.
EVAPORATING PAN.

No. 264,252. Patented Sept. 12, 1882.

Witnesses.
L. J. Lehmann
Robt. Johnson

Inventor.
Saml. Davis
per
F. A. Lehmann,
Atty.

UNITED STATES PATENT OFFICE.

SAMUEL DAVIS, OF MOUNT VERNON, OHIO.

EVAPORATING-PAN.

SPECIFICATION forming part of Letters Patent No. 264,252, dated September 12, 1882.

Application filed July 6, 1882. (No model.)

*To all whom it may concern:*

Be it known that I, SAML. DAVIS, of Mount Vernon, in the county of Knox and State of Ohio, have invented certain new and useful Improvements in Evaporating-Pans; and I do hereby declare the following to be a full, clear, and exact description of the invention, such as will enable others skilled in the art to which it pertains to make and use it, reference being had to the accompanying drawings, which form part of this specification.

My invention relates to an improvement in attachments for evaporating-pans; and it consists in a number of small divisions of any suitable shape or size, and which may be either secured together or used single, and which are to be placed on the bottom of the evaporating-pan for the purpose of assisting in evaporation, as will be more fully described hereinafter.

The object of my invention is to provide suitable divisions which are to be placed on the bottom of the evaporating-pan for the purpose of acting both as conductors and to form a much larger heating-surface, so as to aid the evaporation and increase the amount of steam thrown off, and thus not only quicken the process of evaporation, but cheapen the cost in fuel.

Figure 1:
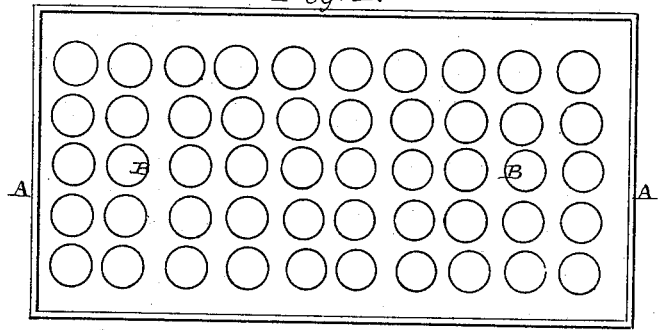
Figure 2:
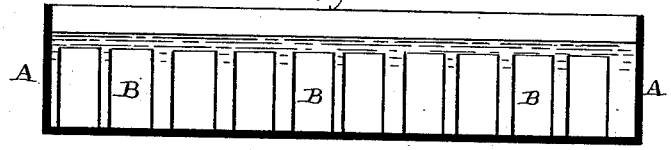
Figure 3:

Figure 1 is a plan view of the pan to which my attachments are applied. Fig. 2 is a vertical section of the same. Fig. 3 shows different forms of the divisions.

A represents an ordinary evaporating-pan, of any suitable shape, size, or depth, in which a number of divisions, B, are placed. These divisions are formed of sheet metal or any other suitable material, and may be made tubular, square, three-cornered, scroll-shaped, or any other shape that may be preferred. These divisions may be used single or secured together in pairs; or any desired number of them may be secured together, so that they can be moved as a single one. These divisions are to be placed on the bottom of the evaporating-pan, at any suitable distance apart, and each one, absorbing heat from the bottom of the pan, forms so much additional heating-surface, and at the same time they act as guides to conduct the bubbles which are formed upon the bottom of the pan upward through the fluid. Where no divisions are used the bottom of the pan is constantly covered with bubbles, which rise but slowly through the fluid, but where divisions are used these bubbles rise rapidly to the surface, and thus increase the evaporation to a greater extent. The lower end of each one of the divisions will be shaped so as to conform to the bottom of the pan in which they are placed.

I have discovered by actual test that where the conductors are used the evaporation is increased in direct proportion to the number used, and that the evaporation in the ordinary pan can be increased from twelve to twenty per cent. Not only is the process of evaporation greatly shortened, but a very great saving is made in the amount of fuel used. Where these divisions are secured together they can be readily placed in the pan, and then when it is desired to clean out the pan they can be quickly removed therefrom. I do not limit myself to any particular manner of attaching them together, nor to the size or number of the divisions used, for this is a mere matter of choice. These divisions are equally adapted to be in a steam-boiler for the purpose of increasing the evaporation of the water and the amount of steam generated.

Having thus described my invention, I claim—

The combination of an evaporating-pan with suitable divisions, which are used singly or in pairs, and which are made removable, substantially as set forth.

In testimony whereof I affix my signature in presence of two witnesses.

S. DAVIS.

Witnesses:
 F. A. LEHMANN,
 W. H. KERN.